United States Patent
Wirth et al.

(10) Patent No.: US 7,968,023 B2
(45) Date of Patent: Jun. 28, 2011

(54) METHOD FOR THE PRODUCTION OF POLYURETHANE BLOCK FOAM

(75) Inventors: Juergen Wirth, Cologne (DE); Martin Schamberg, Sankt Augustin (DE); Horst Klahre, Sankt Augustin (DE)

(73) Assignee: Hennecke GmbH, Leverkusen (DE)

( * ) Notice: Subject to any disclaimer, the term of this patent is extended or adjusted under 35 U.S.C. 154(b) by 188 days.

(21) Appl. No.: 12/447,824

(22) PCT Filed: Oct. 19, 2007

(86) PCT No.: PCT/EP2007/009066
§ 371 (c)(1),
(2), (4) Date: Apr. 29, 2009

(87) PCT Pub. No.: WO2008/052670
PCT Pub. Date: May 8, 2008

(65) Prior Publication Data
US 2010/0072651 A1    Mar. 25, 2010

(30) Foreign Application Priority Data

Oct. 31, 2006  (DE) .......................... 10 2006 051 311

(51) Int. Cl.
*B29C 65/00* (2006.01)
*B29C 44/08* (2006.01)
*B28B 11/18* (2006.01)
*C08J 9/00* (2006.01)

(52) U.S. Cl. ............... 264/41; 264/55; 264/165; 521/50

(58) Field of Classification Search .................. None
See application file for complete search history.

(56) References Cited

U.S. PATENT DOCUMENTS

| | | | | |
|---|---|---|---|---|
| 3,123,856 A * | 3/1964 | Dye et al. | ...................... | 264/46.2 |
| 3,553,300 A * | 1/1971 | Buff | ................................ | 264/41 |
| 3,560,599 A * | 2/1971 | Ferstenberg | .................... | 264/41 |
| 3,773,876 A * | 11/1973 | Rath et al. | ..................... | 264/45.4 |
| 3,775,522 A * | 11/1973 | Auge | ........................... | 264/46.2 |
| 3,786,122 A * | 1/1974 | Berg | ........................... | 264/46.2 |
| 3,809,512 A * | 5/1974 | Blackwell et al. | ............ | 425/4 C |
| 4,060,579 A * | 11/1977 | Schmitzer et al. | .............. | 264/51 |
| 4,102,621 A * | 7/1978 | Talbert | ........................ | 425/224 |
| 4,108,585 A * | 8/1978 | Proksa et al. | .................. | 425/89 |
| 4,120,626 A * | 10/1978 | Keller | ............................ | 425/89 |
| 4,154,562 A * | 5/1979 | Tabler | ............................ | 425/89 |
| 4,255,105 A * | 3/1981 | Hoffmann et al. | ............. | 425/144 |
| 4,264,291 A * | 4/1981 | Hoffmann et al. | ............. | 425/224 |
| 4,267,135 A * | 5/1981 | Stroud et al. | .................... | 264/51 |
| 4,270,889 A * | 6/1981 | Hoffmann et al. | ............ | 425/115 |
| 5,375,988 A * | 12/1994 | Klahre | ........................... | 425/4 C |
| 5,578,655 A * | 11/1996 | Fiorentini | ..................... | 521/155 |

(Continued)

FOREIGN PATENT DOCUMENTS

DE    44 25 319 A    1/1996

(Continued)

*Primary Examiner* — Christina Johnson
*Assistant Examiner* — Benjamin Schiffman
(74) *Attorney, Agent, or Firm* — Lucas & Mercanti, LLP (57) ABSTRACT

The invention relates to a process and a device for the production of polyurethane clock foam, in which the reaction mixture, after flowing through a mixer, flows freely from an outflow opening and then flows through an accumulation chamber, in which a static pressure is built up, a gap and finally an expansion chamber.

13 Claims, 2 Drawing Sheets

U.S. PATENT DOCUMENTS

| | | | | |
|---|---|---|---|---|
| 5,582,840 | A * | 12/1996 | Pauw et al. | 425/4 C |
| 5,656,678 | A * | 8/1997 | Walmsley | 521/155 |
| 5,665,286 | A * | 9/1997 | Sulzbach et al. | 264/46.2 |
| 5,804,113 | A * | 9/1998 | Blackwell et al. | 264/51 |
| 5,844,015 | A | 12/1998 | Steilen et al. | |
| 6,036,898 | A * | 3/2000 | Sulzbach et al. | 264/51 |
| 7,101,163 | B2 * | 9/2006 | Sulzbach et al. | 425/4 C |
| 7,179,410 | B2 * | 2/2007 | Griffiths | 264/51 |
| 7,293,594 | B2 * | 11/2007 | Knapp et al. | 156/549 |
| 2008/0145544 | A1 * | 6/2008 | Schamberg et al. | 427/373 |

FOREIGN PATENT DOCUMENTS

| | | | |
|---|---|---|---|
| DE | 19525664 | A1 * | 1/1997 |
| EP | 689920 | A2 * | 1/1996 |
| WO | WO 2006082036 | A1 * | 8/2006 |

* cited by examiner

METHOD FOR THE PRODUCTION OF POLYURETHANE BLOCK FOAM

This application is a 371 of PCT/EP2007/009066 filed Oct. 19, 2007, which in turn claims the priority of DE 10 2006 051 311.8 filed Oct. 31, 2006, the priority of both applications is hereby claimed and both applications are incorporated by reference herein.

The invention relates to a process and to a device for the production of polyurethane block foam, in which the reaction mixture, after flowing through a mixer, flows freely out of an outflow opening and then flows through an accumulation chamber, in which a static pressure is built up, a gap and finally an expansion chamber.

The continuous production of polyurethane block foam is currently carried out substantially by one of two different processes:

the so-called liquid laydown procedure and the trough procedure.

Both processes are described, for example, in Kunststoff-Handbuch Volume 7 from Hanser-Verlag (3rd, revised edition, 1993, ISBN 3-446-16263-1, pages 197-200).

The fundamental difference between these two processes is that in the trough procedure, the liquid reaction mixture is introduced from beneath into a trough, from which it escapes, in partly expanded form, over an overflow edge onto the base paper, while in the liquid laydown procedure the liquid reaction mixture is applied in liquid form to the base paper.

A fundamental advantage of the liquid laydown procedure is that, unlike the trough procedure, any air bubbles present in the reaction mixture, which can later lead to voids in the foam, are still able to escape into the atmosphere after the reaction mixture has been discharged onto the base paper. This is a very important advantage, for example, in the production of sheeting (i.e., when the foam block is later cut into sheeting), because voids here can quickly lead to large amounts of rejects.

The liquid laydown procedure is currently generally carried out using a rectangular device in which, in the early expansion stage of the polyurethane foam (PUR foam), mats are placed onto the rising foam with adjustable force in order to achieve as rectangular a block cross-section as possible thereby resulting in low amounts of waste. This process is described in Kunststoff-Handbuch Volume 7 (3rd, revised edition, 1993, ISBN 3-446-16263-1, pages 197-200) and also in GB-A-1392859 and GB-A-1487848 and is known in the literature as the Hennecke-Planibloc rectangle process.

This process was improved as described in patent specification DE-A-2557572 in that the cover paper is placed on the reaction mixture while it is still liquid, in order to avoid air inclusions as a result of an irregular rise profile when the foam first comes into contact with the cover paper. Even before the foam begins to rise, the cover paper is lowered to such an extent that there forms between the base paper and the cover paper a gap that is so small that the reaction mixture readily accumulates in front of the gap. A further positive side-effect of this gap is its distributing action. The accumulation of reaction mixture promotes the distribution of the reaction mixture over the entire width. The cover paper is generally slightly narrower than the foaming width, so that the mixture at the sides is in contact with the atmosphere. The foaming width is understood as being the width of the polyurethane reaction mixture that foams on the conveyor belt or base paper, which ultimately corresponds to the width of the resulting foam. This width is defined by the spacing between the lateral side walls in the region of the foaming and curing zone.

A disadvantage of this process is that the age distribution of the reaction mixture on entry into the expansion zone is not optimum. Although this process generally allows the mixture to be distributed over the necessary width in the case of an irregular flow, the quantitative distribution over the width still remains very inhomogeneous. The reaction mixture flows into the expansion zone at a higher speed, and therefore in a larger amount, in the middle than in the edge regions. The foaming process accordingly begins further downstream in the middle than in the edge regions. Because the lower conveyor belt in such installations is in principle inclined downwards in the production direction (either at a constant angle of, e.g., 4° over the entire production length, or in an adjustable manner via movable plates, the so-called fall plates, over the first, e.g., 6 to 8 meters), this can have the result that the higher-density, still relatively liquid portions of the mixture under-run the lower-density, lighter portions of the mixture and move ever more in advance thereof. This then causes serious flaws in the foam and leads to rejects. This risk of advancing, relatively liquid mixture portions in the middle accordingly limits the angle of inclination of the lower conveyor belt.

At the same time, however, there is also the risk that material may run backwards, especially in the edge regions, if the rise profile in the expansion zone is too steep. The limited steepness of the rise profile means, however, that the block height and the belt speed must be in a specific ratio.

It is to be ensured that attempts are, of course, made to produce blocks that are as high as possible, because the percentage losses in the cover layer and the base layer are thereby reduced. The block height is otherwise limited primarily by the fact that, as the block height increases, the density distribution in the block becomes worse, because a higher pressure is exerted on the lower layers during foaming than on the upper layers. Ultimately, these marginal conditions mean that the machines must be operated, dependent on the process, with a specific minimum belt speed of about 4 m/minute and also with large discharge capacities of up to 500 kg/minute. This is expedient as long as the machine is nevertheless operated with good performance. In reality, however, installations are frequently operated for only a few hours per day, so the investment costs are comparatively great in relation to the other costs, so that a continuous block foam machine operates economically only if the annual production is relatively large.

It has been possible to achieve an improvement in the process by means of the calibration plate described in EP-A-0689920. Because the reaction mixture now flows through a gap over a longer distance, the distributing action is improved, so that the more quickly flowing mixture is slowed down to a greater extent. Nevertheless, the problem still remains that the angle of downwards inclination is limited by the risk of younger mixture under-running older mixture and, at the same time, if the angle of inclination is too flat and the upward rise profile is too steep, the reaction mixture in the edge regions can in the worst case run back in the opposite direction to the transport direction. In this process too, therefore, relatively narrow limits are imposed as regards the achievable foam height in dependence on the belt speed.

A process directed to the production of blocks having a steep rise profile (with the aim of achieving blocks that are as high as possible) is described in DE-A-2726084. In an embodiment of this process (FIG. 2), the mixture is fed from above via a transverse distribution pipe and a guide plate into a channel-like trough, from which it passes via a feed sheet onto the base film, the mixture, according to the description (page 4), being allowed to begin to react before it is applied. Furthermore, according to FIG. 2 there is a visible gap between the guide plate 36 and the base film, which makes it impossible to produce an appreciable static preliminary pressure at that point. Provided the mixture is still flowable, it would flow, with an appreciable static preliminary pressure, downwards through the gap and react completely there, which would greatly impede the movement of the film and probably cause the base film to tear or the belt to stop.

The closest prior art to the solution according to the invention is disclosed in EP-A-25084. the gap formed between the mixture feed table and the transverse distribution member is similar at a quick glance, when viewed from the side, to the accumulation chamber employed in the present invention.

However, the device in EP-A-25084 represents a pure distribution member, the sole purpose of which is to distribute the mixture over the full width as far as the foaming zone that begins downstream of the bend. Complete sealing against static liquid pressure in the lower region of the gap and at the bend is neither mentioned in the text nor visible in the figures. Nor is such sealing necessary, because no static pressure forms at the outside edges under the operating conditions for which the process was developed, and which are also described in the examples. The overall thickness of the resulting sheets was only 40 mm at a density of 30 kg/m$^3$, so that a maximum static pressure of 12 Pa can form on the foaming side. This minimal static counter-pressure, in conjunction with the high belt speed, ensures that no material is able to flow back in the edge region, and accordingly the problem underlying the invention did not even exist.

Accordingly, the device described in EP-A-25084 does not have all-round sealing in the transition region from the accumulation chamber to the expansion zone. It is therefore not possible with this device to build up any appreciable static preliminary pressure over the entire foaming width, so that at relatively steep rise profiles material runs back in the edge regions.

The problem underlying the invention of a slow-speed continuous block foam machine has, however, already been taken up again in patent specification EP-A-1328388. The solution proposed therein is a closed system from the metering unit to the expansion zone brings problems, however:

possible pulsations in the system, which can come, for example, from the metering unit or from the mixer unit (e.g., as a result of gas voids, which are then carried along in a surge), can in principle propagate into the expansion zone because there is no separation of the systems by contact with the surrounding atmosphere;
  gas bubbles, which can form anywhere in the system, are no longer able to escape and necessarily lead to voids in the subsequent foam;
  it is not at all a triviality to distribute the mixture uniformly over a width of 2 meters in a closed system, with good age distribution, and thereby avoid the formation of dead zones under very different operating conditions (mass flows, viscosities). In DE-A-69112786, page 5, it is stated that, with an open trough, "when viewed over the width of the channel", there are "considerable differences in terms of the speed with which the reacting foam mixture flows from the vessel outlet to the conveyor device". While this disadvantage can be compensated for in open trough operation because the mixture, on leaving the trough, is able to flow freely to the side along the boundary surface with the atmosphere, that is not possible in a closed system. In fact, there is a greater risk in such a case that a preferred channel will form through which the majority of the reaction mixture preferably flows, which then results in very unfavorable age distribution.

The technical object of the present invention is to provide a process and a device for the production of polyurethane block foam at low belt speeds of from 0.5 to 3 m/minute, while avoiding the above-mentioned disadvantages.

The solution according to the invention therefore makes use of the separation of the metering, mixing and discharge region from the expansion zone, which was developed for higher feed capacities. The necessary pressure to prevent material from running back in the case of a relatively steep rise profile and low belt speeds of from 0.5 to 3 m/minute is not applied by the metering devices but by the static preliminary pressure resulting from the static height.

The invention relates to a continuous process for the production of polyurethane block foam, in which the reactive components polyol and isocyanate are fed in metered amounts to a mixer (1) and are mixed therein to form a polyurethane reaction mixture, and the polyurethane reaction mixture is applied to a conveyor belt (7) and foamed and cured thereon, characterised in that a) after mixing, the polyurethane reaction mixture is discharged in free-flowing manner from the mixer (1) through at least one outflow opening (15) and flows through the feed opening (3) into an accumulation chamber (4) which is extended in the vertical direction and closed at the sides and which opens in the region of the base into a gap opening (5), and
  b) the polyurethane reaction mixture accumulates in the accumulation chamber (4) so that static pressure is produced at the base of the accumulation chamber over the entire width, and the polyurethane reaction mixture flows through the accumulation chamber (4) from top to bottom, and
  c) the polyurethane reaction mixture then flows through the gap opening (5) out of the accumulation chamber (4) and flows through a gap (6), the underside of the gap being formed by a conveyor belt (7) and the gap being closed at the top and bottom and at the lateral edges, and
  d) the polyurethane reaction mixture then flows from the gap (6) into the expansion chamber (8) and foams therein, the conveyor belt (7) forming the underside of the expansion chamber (8), and the expansion chamber (8) being closed at the lateral edges, and the flow cross-section of the expansion chamber widening in the transport direction of the conveyor belt (7), and
  e) the foamed polyurethane reaction mixture leaves the expansion chamber through an outlet opening and optionally foams further and cures on the conveyor belt (7).

"In free-flowing manner" in step a) means that the PUR reaction mixture is not enclosed on all sides but is in contact with the surroundings, for example, with the atmosphere. As a result, film degassing as mentioned above, which is very advantageous for preventing voids, is possible and the expansion region is separated from the metering and mixing unit.

In a possible form of the process according to the invention, the polyurethane mixture, after being mixed in the mixer, first flows through a hose or a pipe as well as optionally through a pressure-setting member, such as, for example, a restrictor, before it is discharged in free-flowing manner through the outflow opening.

The static pressure that is produced at the base of the accumulation chamber is advantageously in a range of from 100 to 5000 pascals, preferably from 150 to 3000 pascals and particularly preferably from 200 to 2000 pascals. An absolute pressure corresponding to the sum of atmospheric pressure and the static pressure then prevails at the base of the accumulation chamber. The process according to the invention ensures that a sufficient static preliminary pressure builds up over the entire width of the accumulation chamber, because only then can material reliably be prevented from running back in the edge regions too.

The term "static preliminary pressure" within the scope of this invention means the pressure that would be exerted by a column of liquid in the accumulation chamber in the static state. It can be calculated by the formula $$p = \rho \cdot g \cdot h$$

wherein h is the linear measurement from the upper liquid level, that is to say the boundary surface of the reaction mixture with the atmosphere, to the base of the accumulation chamber (represented by the gap opening). With a mean density of, for example, 1100 kg/m³ and acceleration due to gravity of 9.81 m/s², the static preliminary pressure in the case of, for example, a column of liquid of 5 cm would be 540 pascals. Of course, the tractive forces of the paper on the reaction mixture additionally has an effect. Moreover, the actual static pressure falls locally, depending on the gap measurement, by the dynamic component $$\frac{\rho}{2} v^2.$$

A static pressure of 100 pascals at the sides is sufficient to compensate for 30 cm rise height at a bulk density of 20 kg/m³ and accordingly reliably prevent the flow of reaction mixture relative to the separator sheet in the opposite direction to the transport direction.

The static pressure at the base of the accumulation chamber should therefore preferably be at least 100 pascals in the edge region too, which corresponds to a column of liquid of about 1 cm. However, because the reaction mixture should leave the vertically inclined accumulation chamber in substantially liquid form where possible, the accumulation chamber must also not be too long.

The accumulation chamber must, of course, be extended in the vertical direction, because only in that manner is it possible to produce a static preliminary pressure with a defined, limited dwell time. In addition to the lateral boundary walls, the accumulation chamber requires a rear wall that is inclined relative to the horizontal and a front wall that is inclined relative to the horizontal.

Preferably, at least one lateral boundary surface of the accumulation chamber, that is to say at least the forward and/or rear boundary surface in the production direction and/or at least one lateral boundary surface, is spanned by a conveyor belt or a separator sheet, for example a paper sheet, guided thereon. In that case, the extent of the accumulation chamber is preferably only such that the reaction mixture, which is in contact with the separator sheet moved through the accumulation chamber, leaves the accumulation chamber again after not more than 10 seconds, preferably after not more than 5 seconds. These mixture components flow through the accumulation chamber substantially at the belt speed. In addition, because there is no process-related necessity for a static preliminary pressure above 5000 pascals, that value of 5000 pascals for the static pressure at the base of the accumulation chamber represents the upper limit for an advantageous embodiment of the process. 5000 pascals represent a column of liquid of about 50 cm under the above-mentioned conditions.

The reaction mixture can, in principle, be discharged from the mixer directly through the feed opening into the accumulation chamber. However, in a preferred embodiment, the reaction mixture can be discharged either onto the separator sheet forming the rear boundary of the accumulation chamber in the production direction, or onto the separator sheet forming the front boundary of the accumulation chamber in the production direction, or onto both separator sheets simultaneously. Therefore, the preferred ranges for the angles of inclination of the respective separator sheets in the region of the accumulation chamber are arranged symmetrically relative to the vertical.

The angle of inclination α of the rear separator sheet, which forms the rear boundary surface of the accumulation chamber, viewed in the production direction, relative to the horizontal should preferably be in a range from 10° to 170°, particularly preferably from 20° to 160° and very particularly preferably from 45° to 135°.

Likewise, the angle of inclination β of the front separator sheet, that is to say of the front boundary surface of the accumulation chamber, when viewed in the production direction, relative to the horizontal should preferably be in a range from 10° to 170°, particularly preferably from 20° to 160° and very particularly preferably from 45° to 135°.

The gap through which the polyurethane reaction mixture flows after leaving the accumulation chamber can in the simplest case be formed by the narrowest cross-section between the upper separator sheet, which is moved over a simple deflecting roll or roller, and the lower separator sheet.

Preferably, however, the gap has a horizontal extent in the direction of flow of from 5 to 100 cm and particularly preferably from 10 to 50 cm and is formed substantially horizontally. Ideally, the reaction mixture then flows into the subsequent expansion zone virtually without speed relative to the upper and lower separator sheets.

The gap can be in the form of a flat channel or alternatively in the form of a gap with a progressively widening cross-section, so that the higher speeds of the reaction mixture as it flows out of the vertically inclined accumulation chamber are reduced without burbling. In this preferred embodiment of the process according to the invention, this gap serves as a buffer and calming zone between the accumulation chamber and the expansion zone. The gap height h is preferably adjustable and is advantageously adjusted so that the gap height h is adjusted, in dependence on the foaming width b, the belt speed v and the volume flow V, according to the formula $$h = k \cdot \frac{\dot{V}}{b \cdot v}$$

wherein the factor k is preferably in a range from 0.8 to 1.2 and is particularly preferably from 0.9 to 1.1 and wherein k can readily be determined by the person skilled in the art by means of experiments. The foaming width is in turn understood as being the width of the polyurethane reaction mixture foaming on the conveyor belt or base paper, which ultimately corresponds to the width of the resulting foam. This width is determined by the spacing of the lateral side walls in the region of the foaming and curing zone. Typically, the foaming widths are in a range from 1.5 to 2.5 meters.

The reaction mixture must leave the accumulation chamber in substantially liquid form, because otherwise it tends to flow upwards in the opposite direction to the transport direction due to the decreasing density in the accumulation chamber. The gap helps to ensure that the reaction mixture flows over the entire width, where possible with uniform speed and where possible without speed relative to the separator sheets, into the expansion zone.

The polyurethane reaction mixture is therefore substantially liquid until it leaves the accumulation chamber, i.e. the reaction mixture has up to that point expanded by less than 10%, preferably less than 5%, as compared with the initial state.

The polyurethane reaction mixture, as it flows, is enclosed in the system comprising the accumulation chamber, the gap and the expansion chamber, which is open to the surroundings only through the feed opening and the outlet opening. This means that no PUR reaction mixture can escape even at the points of connection between the accumulation chamber, the gap and the expansion chamber.

In a preferred embodiment of the process according to the invention, the gap extends substantially over the entire width of the conveyor belt. Likewise preferably, the width of the expansion chamber extends substantially over the entire width of the conveyor belt.

The term conveyor belt also includes, for example, a separator sheet that may be present, such as a base paper which is guided over the conveyor belt. The terms conveyor belt and separator sheet are therefore used as equivalent terms.

In a preferred embodiment of the process, the gap opening at the outlet from the accumulation chamber is in the form of a narrow calibration gap. By means of this gap, which is preferably adjustable, the static height and accordingly the static pressure can be influenced. In particular, it is thereby possible to influence the ratio between the static pressure in the middle and the static pressure at the sides, which in turn has a direct influence on the quantitative distribution over the width. The greater the orientation of the gap in the direction of acceleration due to gravity, the narrower it can be and the better its distributing action. The gap width of this calibration gap should preferably be from 0.5 to 30 mm and particularly preferably from 1 to 20 mm. The gap width is preferably chosen, in dependence on the foaming width b, the viscosity the angle of inclination δ of the conveyor belt (separator sheet) in the region of the gap in the production direction relative to the horizontal, and the volume flow V of the reaction mixture, to be so narrow that the gap brings about additional accumulation of the mixture. The gap width s should therefore be adjusted according to the unequation $$s < \sqrt[3]{\frac{12 \cdot \eta \cdot \dot{V}}{b \cdot g \cdot \rho \cdot \sin \delta}}$$

wherein g is acceleration due to gravity and ρ is the density of the reaction mixture. The viscosities of the polyurethane reaction mixtures used are generally in a range from 100 to 1000 in Pas. The viscosity can be determined, for example, by means of rotary viscometers according to DIN-EN-ISO-3219 at a shear rate of 100 $s^{-1}$. However, when determining the viscosity of polyurethane reaction mixtures, it is necessary to omit the addition of water and activators and, optionally, also stabilizers, so that the reaction between the reaction partners becomes sufficiently sluggish for the measuring process to be carried out. For that reason, the measurements must be carried out without the formulation constituents catalysts, water and stabilizer. However, because these generally account for less than 5 wt. % of the total amount, the value calculated for the viscosity can be used with sufficient accuracy as the reference value for the design formula. Furthermore, because the reaction mixture flows through the gap substantially in liquid form in the present invention, the viscosity increase that occurs as the reaction progresses is also disregarded.

In principle, the system as a whole behaves like hydraulically communicating pipes. A stationary equilibrium of forces is established between the static pressure of the liquid reaction mixture on the inflow side and the static pressure of the expanding foam in the expansion zone, the frictional forces of the separator sheet on the mixture and the impulse forces of the flow also having an additional effect. Due to the large difference in density between the liquid reaction mixture and the expanded foam, a height of a few cm on the inflow side (in the accumulation chamber) is sufficient to compensate for the static pressure in the expansion zone. The foam height, i.e., the height of the expanded foam, is usually in a range from 0.7 m to 1.5 m. Without the narrow chamber in that region (i.e., the accumulation chamber), however, the static pressure from the accumulation chamber would result in the substantially liquid reaction mixture running over a large area on the inflow side, with the formation of a large lake of reaction mixture with too high a mean dwell time.

The accumulation chamber, in conjunction with the gap, therefore allows the necessary preliminary pressure to be produced over the entire width of the gap, without the occurrence of problems associated with too great and non-uniform a dwell time.

The critical advantage of the invention as compared with the processes of the prior art is that, due to the additional static height in the accumulation chamber upstream of the entry into the substantially horizontal calibration gap, it is possible to homogenize the driving forces for relative flow as compared with the separator sheet over the width.

The invention relates also to a device for the production of polyurethane block foam, comprising storage containers for the reactive components polyol and isocyanate, pumps and pipes for metering the reactive components from the storage containers to a mixer (1) containing an outflow opening (15) for discharging the polyurethane reaction mixture in a free-flowing manner, and a conveyor belt (7) on which the polyurethane reaction mixture can foam and cure, characterized in that a) beneath the at least one outflow opening (15) there is arranged an accumulation chamber (4) which is extended in the vertical direction and closed at the sides and which has a feed opening (3) for the supply of polyurethane reaction mixture and, in the region of the base, a gap opening (5) for the delivery of polyurethane reaction mixture, and b) the accumulation chamber (4) opens through the gap opening (5) into a gap (6), the underside of the gap being formed by a conveyor belt (7) and the gap being closed at the top and bottom and at the lateral edges, and c) the gap opens into the expansion chamber (8), the conveyor belt (7) forming the underside of the expansion chamber (8), the expansion chamber (8) being closed at the lateral edges, and the flow cross-section of the expansion chamber (8) widening in the transport direction of the conveyor belt (7), and d) the expansion chamber (8) has an outlet opening, the system comprising the accumulation chamber (4), the gap (6) and the expansion chamber (8), with the exception of the feed opening (3) into the accumulation chamber (4) and the outlet opening from the expansion chamber (8), being closed on all sides.

The mixer contains an outflow opening for discharging the polyurethane reaction mixture from the mixer in a free-flowing manner. This means that the outlet opening from the mixer is preferably so arranged with regard to the feed opening into the accumulation chamber, that the polyurethane reaction mixture is able to flow in a free-flowing manner from the outlet opening into the feed opening, it being entirely possible for further components, such as, for example, a feeding conveyor belt that is inclined relative to the horizontal or a feed plate that is inclined relative to the horizontal, to be arranged between the outflow opening and the accumulation chamber. The flow path of the polyurethane reaction mixture between the outlet opening and the feed opening is not a closed system, so that gases are able to escape from the polyurethane reaction mixture. The outflow opening can have any desired shape, preference being given to the shape of the gap opening, a round opening or an elliptical opening.

In a possible embodiment of the device according to the invention, a hose or a pipe and also, optionally, a pressure-setting member, such as, for example, a restrictor, is arranged between the actual mixing member and the outflow opening.

The expansion chamber preferably extends substantially over the foaming width b, that is to say its width is preferably at least 90% of the spacing of the lateral side walls in the foaming and curing zone.

The volume of the accumulation chamber is preferably chosen, in dependence on the volume flow V, so that the dwell time t of the polyurethane reaction mixture in the accumulation chamber is not more than 10 seconds, preferably not more than 5 seconds. Accordingly, the volume of the accumulation chamber is preferably designed according to the unequation $$V \leq V \cdot t_{max}$$

wherein the value for $t_{max}$ is up to 10 seconds, preferably 5 seconds. The volume flows can be from 30 to 500 kg/minute, depending on the belt speeds. The volume flows are preferably from 50 to 250 kg/minute.

The invention is described in greater detail below with reference to the following figures.

In the Figures

Figure 1:
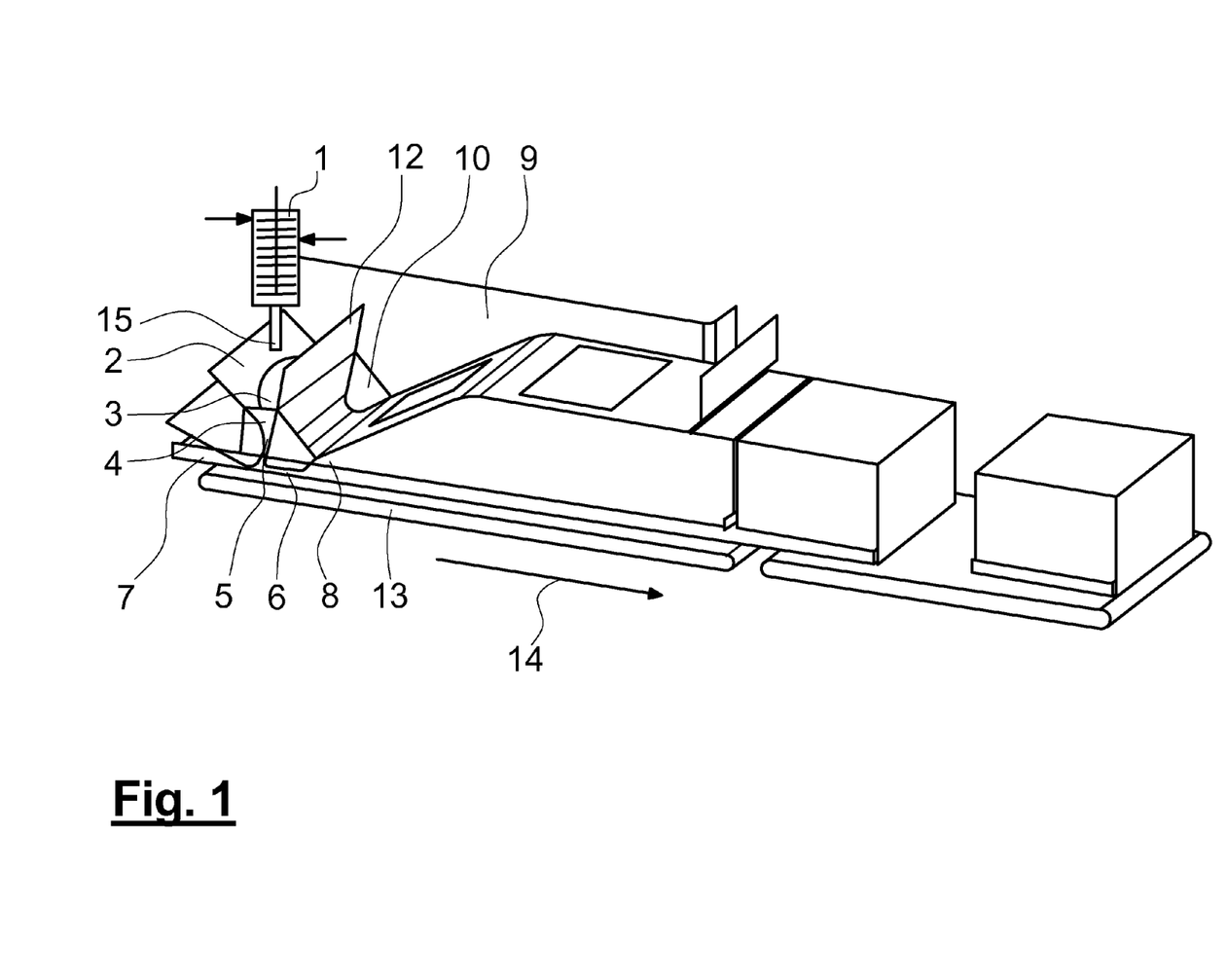
FIG. 1 shows a three-dimensional view of a process according to the invention and of the device according to the invention.

FIG. 1 shows a possible embodiment of the process according to the invention.

The metering devices, tanks and other elements for processing the reactive components and the various additional components are not shown in FIG. 1.

The tightness of the installation relative to the atmosphere in the region of the accumulation chamber 4, the gap 6 and the expansion chamber 8 is achieved by means of a guide cage 10 produced, for example, from metal sheets. The polyurethane reaction mixture is discharged from the mixer 1 through the at least one outlet opening 15 onto a moving feeding separator sheet 2 and then flows in a free-flowing manner through the upper feed opening 3 into the accumulation chamber 4, which tapers conically to the bottom. The flow space of the accumulation chamber 4 is delimited by the upper feed opening 3, the side walls of the guide cage 10 and the feeding separator sheet 2, which is guided along the rear wall of the guide cage, the rear or upper separator sheet 12, which is guided along the front wall of the guide cage, and by a lower gap opening 5. The reaction mixture is then deflected and flows through the horizontal gap 6, before it flows into the expansion zone 8. The expansion chamber 8 is delimited by the side walls of the guide cage 10 and at the top by the upper or covering separator sheet 12, which is guided along the front wall of the guide cage, and at the bottom by a separator sheet 7 delivered from the rear, which is turned up at the edges, in order to ensure a tight transition to the lateral separator sheet 9 behind the guide cage. The production direction is indicated by arrow 14.

At the same time, the feeding separator sheet 2, onto which the mixture was first discharged, is conveyed away downwards. The separator sheet 7 delivered from the rear permits sealing relative to the drive belt 13. After the partly expanded foam strand has left the guide cage 10, the side paper 9 assumes lateral sealing. This form with a guide cage 10 represents a relatively simple variant of the method for enabling tightness to be achieved relative to the atmosphere in the region from the accumulation chamber 4 to the expansion zone 8.

On the inflow side, sufficient static preliminary pressure can then build up so that the reaction mixture is carried into the expansion zone 8 without appreciable flow relative to the separator sheet 7. As long as the reaction mixture is flowable, the foam block must be supported at the bottom, even after leaving the guide cage 10, depending on the steepness of the rise profile, in order to prevent material from running back in the upper region. To this end, mats, for example, can be placed on the cover paper with a light, adjustable force.

It is, of course, also conceivable to dispense with the guide cage 10 and instead to guide the separator sheets over deflecting rolls or rollers, for example. Lateral sealing could also be assumed in the region of the accumulation chamber by the separator sheet 7 delivered from the rear, if that sheet is folded upwards sufficiently.

It is advantageous to guide the separator sheets in particular so flexibly that the contour of the flow space in the region of the accumulation chamber 4 to the expansion zone 8 can be adjusted in many ways. It is important, however, that the separator sheets should be suitably sealed in the region of the transitions from the accumulation chamber 4 to the expansion zone 8.

Figure 2:
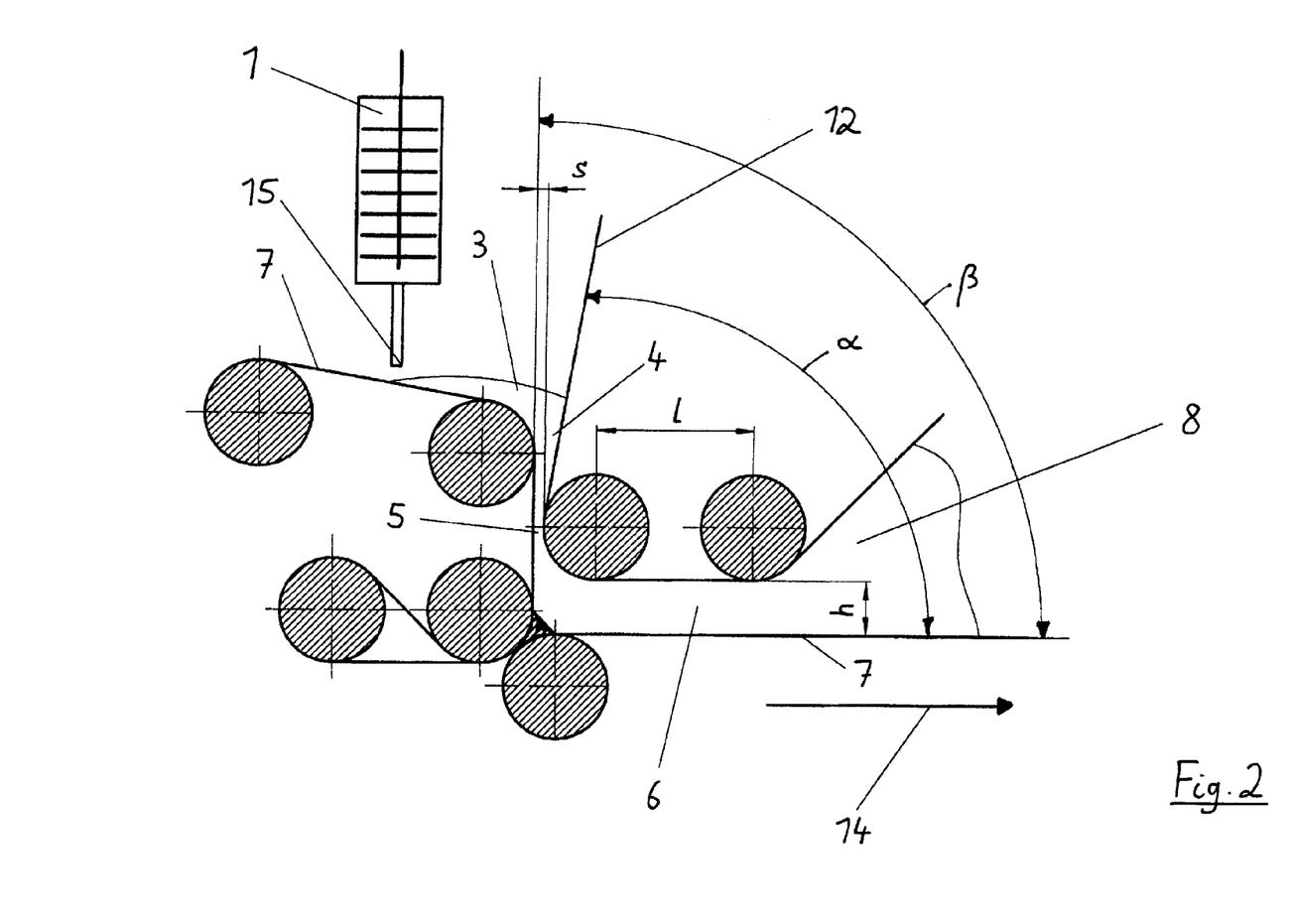
FIG. 2 shows a two-dimensional view of the process according to the invention.

The most important process parameters will be found in FIG. 2, which shows a possible embodiment of the process of the invention in a two-dimensional representation.

The reaction mixture is discharged in free-flowing manner from the mixer 1 through the outlet opening 15 directly onto the separator sheet 7 and then flows in the form of a film through the feed opening 3 from above into a vertically inclined accumulation chamber 4. This is in conical form in this case, the rear or upper separator sheet 12 in this case having an angle of inclination $\alpha = 80°$ relative to the vertical, while the separator sheet 7, after being deflected in the region of the accumulation chamber 4, has an angle of inclination $\beta = 90°$ relative to the horizontal. The conical accumulation chamber 4 opens into a short, vertically oriented calibration gap with the gap opening 5. The narrower the calibration gap, i.e. the smaller the dimension s shown in FIG. 2, the higher the mixture accumulates in the accumulation chamber 4 and the better the distributing effect of the calibration gap. The mixture is deflected downstream of the vertically oriented calibration gap with the gap opening 5 and flows into the horizontally running gap 6 of length l and height h. The height h is preferably so adjusted that the mixture is able to flow through the gap where possible without speed relative to the upper separator sheet 12 and to the separator sheet 7. At the outlet cross-section of the gap, the reaction mixture then flows into the expansion chamber 8. The production direction is indicated by arrow 14.

Due to the static preliminary pressure, it is even possible in principle to adjust the drive belt (not shown in FIG. 2) and accordingly also the lower separator sheet 7 to be inclined upwards in the production direction 14, because material is reliably prevented from running back. As a result, any advance of liquid mixture in the base region can reliably be avoided, because then the more liquid mixture components tend to flow in the opposite direction to the production direction, relative to the already partly expanded mixture components. This means that the foam, based on the age distribution, tends to "sort" itself correctly owing to the effect of gravity, because the younger, more liquid mixture is slowed down relative to the older, already partly expanded mixture.

By contrast, it has generally been necessary to use a downwardly inclined conveyor belt in this region, because mixture components would otherwise run back on the inflow side. The consequence of the downwardly inclined conveyor belt in this region, however, as already explained hereinbefore, is the risk of still liquid, younger mixture components under-running already partly expanded, older mixture components, because, in the case of a conveyor belt inclined downwards in the production direction, the still more liquid mixture components have a greater driving force for flowing in the production direction than do the already partly expanded mixture components, due to the higher density.

In a preferred advantageous form of the process, the base paper is inclined upwards relative to the horizontal in the region of the gap 6 in the production direction by from 0.1° to 5°, particularly preferably by from 0.2° to 4° and very particularly preferably by from 0.5 to 2°.

The lower conveyor belt 7 can continue either with a constant angle of inclination or with variable angles of inclination, achieved by an adjustable fall plate path. The advantage of the fall plate path, which is generally made up of from four to six base plates with adjustable angles of inclination, is that the density distribution is somewhat better, because the mixture is able to expand downwards, matched to the rise profile of the polyurethane foam, so that the frictional forces of the side paper 9 on the foam work against the rise in the pressure gradient owing to the higher static pressure at the bottom and do not act in the same direction, as in the case of upwardly expanding foam. For this reason, in the case of a fall plate path for achieving a good rectangular effect, the mats can generally be placed with less force in the region of the expansion zone 8 than in the case of an installation with a constant angle of inclination of the lower conveyor belt 7. However, it must be ensured, when adjusting the fall plates, that the angle of inclination must not be adjusted too steeply, depending on the reaction progress, because otherwise the under-running of older mixture by younger mixture may occur. However, under-running becomes less likely, the further the reaction has proceeded.

In a particularly advantageous form of the process, which is shown in FIG. 2, the foam, after being discharged in a free-flowing manner into the surrounding atmosphere, comes into contact only with moving sheets and optionally with seals in the corner regions. The PUR reaction mixture is applied directly to the separator sheet 7 and the separator sheet 7 is then deflected several times, so that it serves as the boundary surface of the accumulation chamber 4 and of the gap 6. A separate feeding separator sheet is not required in this embodiment. However, the separator sheet 7 is then guided along on the inside of a bend, or a rounded portion, preferably under tensile stress. This is possible, for example, if the base paper is guided externally or held down in such a manner that it also follows the bend or inside radius. In addition or alternatively, the separator sheet 7 can be held on the contour that it is to follow by means of vacuum. In order that the external guide or the holding-down device does not come into contact with reaction mixture, the side paper (the side paper is not shown in FIG. 2, but corresponds to the side paper 9 in FIG. 1) must be supplied from the side in the region of the accumulation chamber and act as lateral sealing in that region.

It may then be necessary to provide a low-friction sealing material, such as, for example, Teflon (polytetrafluoroethylene) sheet material, between the side paper, which is supplied laterally and first moves inwards, and the separator sheet 7, which passes vertically downwards through the accumulation chamber 4, so that the two separator sheets are able to slide past one another without problems in different transport directions (the separator sheet 7 downwards and the side paper inwards). Downstream of the bend, the separator sheet 7 can then be placed on its edge in the form of a U-fold. In this manner, the region of the accumulation chamber 4 and of the gap 6 is sealed at the rear or at the bottom by the separator sheet 7. The region of the accumulation chamber 4 and of the gap 6 is sealed at the sides by the side papers (the side papers are not shown in FIG. 2, but correspond to the side paper 9 in FIG. 1) that enter from the side in the region of the vertically oriented accumulation chamber 4, and at the top or at the front by the rear or upper separator sheet 12 that is supplied to the accumulation chamber from above. In the region of the transitions from the separator sheet 7 to the side paper 9, or from the rear or upper separator sheet 12 to the side paper 9, lip seals are optionally to be provided, which ensure adequate sealing relative to the reaction mixture at the prevailing static pressure.

Another possibility for guiding the separator sheet 7 in such a manner that it follows the bend or rounded portion would be deflection over, for example, three rollers (as shown in FIG. 2), in which case it is necessary to provide a suitable seal between the first and the third rollers (and optionally also a stripper, which strips off the base paper on the first roller), so that the second roller, which would be connected to the flow space without a suitable seal, is protected from the reaction mixture. Advantageously, the second roller, which comes into contact with the potentially wetted separator sheet, has a suitable coating to which the reaction mixture adheres poorly.

A further alternative for guiding the separator sheet 7 in this region makes use of the fact that double-layer paper is generally used, in which a thin film is applied to a kraft paper. The kraft paper can be moved outwards around a bent angle profile, while the film runs along on the inside and thereby separates the profile from the polyurethane reaction mixture. This embodiment would have the great advantage that no components, apart from the separator sheets, come into contact with the reaction mixture. Of course, it would also be possible to operate the arrangement shown in FIG. 2 in a manner such that only the kraft paper, and not the thin film in contact with the polyurethane reaction mixture, is guided round the rear roller and the film instead continues to run directly forwards. In this case, the film would be separated from the kraft paper in the region of the first of the three rollers and would be applied thereto again in the region of the third roller.

In a further advantageous form of the process, the rear or upper separator sheet 12 is moved with a higher speed as compared with the separator sheet 7 and the side paper. In this manner, it is possible to compensate for the effect that the speed component of the cover paper in the production direction is smaller in the rise zone by the factor cos σ than the speed with which the cover paper is moved.

The process according to the invention can be used particularly advantageously for low belt speeds in a range from 0.5 to 3 m/minute, preferably from 0.8 to 3 m/minute and particularly preferably from 1 to 3 m/minute.

The invention claimed is:

1. A continuous process for the production of polyurethane block foam, in which the reactive components polyol and isocyanate are fed in metered amounts to a mixer and are mixed therein to form a polyurethane reaction mixture, and the polyurethane reaction mixture is applied to a conveyor belt and foamed and cured thereon, wherein
  a) after mixing, the polyurethane reaction mixture is discharged in free-flowing manner from the mixer through at least one outflow opening and flows through the feed opening into an accumulation chamber which is extended in the vertical direction and closed at the sides and which opens in the region of the base into a gap opening, and
  b) the polyurethane reaction mixture accumulates in the accumulation chamber so that static pressure is produced at the base of the accumulation chamber over the entire width, and the polyurethane reaction mixture flows through the accumulation chamber from top to bottom, and
  c) the polyurethane reaction mixture then flows through the gap opening out of the accumulation chamber and flows through a gap, the underside of the gap being formed by a conveyor belt and the gap being closed at the top and bottom and at the lateral edges, and
  d) the polyurethane reaction mixture then flows from the gap into the expansion chamber and foams therein, the conveyor belt forming the underside of the expansion chamber, and the expansion chamber being closed at the lateral edges, and the flow cross-section of the expansion chamber widening in the transport direction of the conveyor belt, and
  e) the foamed polyurethane reaction mixture leaves the expansion chamber through an outlet opening and optionally foams further and cures on the conveyor belt.

2. The process of claim 1, wherein the reaction mixture is discharged from the mixer onto a moving feeding conveyor sheet and is then guided in the region of the accumulation chamber, of the gap and of the expansion chamber from above, beneath and the sides between moving conveyor sheets.

3. The process of claim 1, wherein a static pressure of from 100 to 5000 pascals prevails at the base of the accumulation chamber.

4. The process of claim 1, wherein the polyurethane reaction mixture leaves the accumulation chamber in substantially liquid form.

5. The process of claim 1, wherein the gap is extended in the horizontal direction and runs substantially horizontally.

6. The process of claim 5, wherein the length of the gap in the flow direction is in a range from 5 to 100 cm.

7. The process of claim 6, wherein the conveyor belt in the region of the gap is upwardly inclined relative to the horizontal by an angle of inclination δ in the flow direction.

8. The process of claim 7, wherein the angle of inclination δ is from 0.1° to 5°.

9. The process of claim 1, wherein the gap height h is adjusted, in dependence on the foaming width b, the belt speed v of the conveyor belt and the volume flow V leaving the mixer, in accordance with the formula $$h = k \cdot \frac{\dot{V}}{b \cdot v}$$

wherein the factor k is in a range from 0.75 to 1.25.

10. The process of claim 1, wherein the accumulation chamber is in conical form in its intake region.

11. The process of claim 1, wherein, in the region of the gap, the conveyor belt is inclined relative to the horizontal by an angle of inclination δ of at least 10° in the production direction, the gap width $s_1$ of the gap being chosen in accordance with the unequation $$s_1 < \sqrt[3]{\frac{12 \cdot \eta \cdot \dot{V}}{b \cdot g \cdot \rho \cdot \sin \delta}}$$

wherein b represents the width and δ represents the angle of inclination of the gap, g represents acceleration due to gravity, η represents the viscosity, V represents the volume flow and ρ represents the density of the liquid polyurethane mixture.

12. The process of claim 1, wherein the mean dwell time of the reaction mixture from emerging from the mixer to leaving the accumulation chamber through the gap opening is not more than 15 seconds, preferably not more than 10 seconds and particularly preferably not more than 5 seconds.

13. The process of claim 1, wherein the reaction mixture is discharged from the mixer directly onto the conveyor belt, and the conveyor belt is then deflected several times.

* * * * *